(12) United States Patent
Kakinuma et al.

(10) Patent No.: US 7,626,296 B2
(45) Date of Patent: Dec. 1, 2009

(54) BEARING UNIT AND MOTOR USING BEARING UNIT

(75) Inventors: Yoshiaki Kakinuma, Tokyo (JP); Kenichiro Yazawa, Tokyo (JP); Hiroshi Sato, Chiba (JP); Ichiro Nakamura, Chiba (JP)

(73) Assignee: Sony Corporation, Tokyo (JP)

( * ) Notice: Subject to any disclaimer, the term of this patent is extended or adjusted under 35 U.S.C. 154(b) by 279 days.

(21) Appl. No.: 11/770,166

(22) Filed: Jun. 28, 2007

(65) Prior Publication Data
US 2008/0203839 A1 Aug. 28, 2008

(30) Foreign Application Priority Data
Jul. 5, 2006 (JP) .............................. 2006-185985

(51) Int. Cl.
  H02K 7/08 (2006.01)
  F16C 32/06 (2006.01)
  F16C 33/10 (2006.01)
  F16C 17/10 (2006.01)
(52) U.S. Cl. ..................... 310/90; 384/107; 360/99.08
(58) Field of Classification Search ............... 310/67 R, 310/90; 384/100, 107, 112–115, 121–124, 384/130–132, 902–903; 360/98.07, 99.08
See application file for complete search history.

(56) References Cited

U.S. PATENT DOCUMENTS

| | | | | |
|---|---|---|---|---|
| 6,712,514 B2* | 3/2004 | Mori et al. | ................ | 384/107 |
| 7,011,449 B2* | 3/2006 | Shishido et al. | ............. | 384/107 |
| 7,455,456 B2* | 11/2008 | Shishido et al. | ............. | 384/107 |
| 7,527,431 B2* | 5/2009 | Kakinuma et al. | .......... | 384/100 |
| 2003/0113045 A1* | 6/2003 | Fujinaka | ................. | 384/100 |

FOREIGN PATENT DOCUMENTS

| | | | |
|---|---|---|---|
| JP | 1-80573 | | 5/1989 |
| JP | 2000-352416 | | 12/2000 |
| JP | 2003314537 A | * | 11/2003 |
| JP | 2005-069382 | | 3/2005 |
| JP | 2005-147395 | | 6/2005 |
| JP | 2005-214239 | | 8/2005 |
| JP | 2006-162029 | | 6/2006 |
| WO | WO 2004063581 A1 | * | 7/2004 |

OTHER PUBLICATIONS

Japanese Office Action dated Apr. 9, 2008 for Application No. 2006-185985.
Japanese Office Action issued on Feb. 24, 2009 corresponding to JP Application No. 2006-185985.

* cited by examiner

*Primary Examiner*—Tran N Nguyen
(74) *Attorney, Agent, or Firm*—Sonnenschein Nath & Rosenthal LLP

(57) ABSTRACT

A bearing unit includes a radial bearing; a thrust bearing; a path forming member; a housing; viscous fluid; and a communicating path. The communicating path has an axial path formed in the axis direction on a circumferential face of the radial bearing and a second end side path formed on the second end side face of the radial bearing. The second end side path is formed by a plurality of projections formed on one of the second end side face of the radial bearing and a face of the housing opposing to the second end side face of the radial bearing. The cross section of the second end side path has a cross sectional area greater than that of the cross section of the axial path.

2 Claims, 8 Drawing Sheets

BEARING UNIT AND MOTOR USING BEARING UNIT

CROSS REFERENCES TO RELATED APPLICATIONS

The present invention contains subject matter related to Japanese Patent Application JP 2006-185985 filed with the Japan Patent Office on Jul. 5, 2006, the entire contents of which being incorporated herein by reference.

BACKGROUND OF THE INVENTION

1. Field of the Invention

This invention relates to a bearing unit which supports a rotary shaft for rotation or supports a rotary member for rotation on a shaft and a motor which uses a bearing unit.

2. Description of the Related Art

Various bearing units for supporting a rotary shaft for rotation are known, and an exemplary one of bearing units in related art has such a configuration as shown in FIG. 18.

Referring to FIG. 18, the bearing unit 100 shown supports a rotary shaft 101 for rotation and includes a radial bearing 104 for supporting the rotary shaft 101 in a circumferential direction and a housing 105 in which the radial bearing 104 is accommodated.

In the bearing unit 100, the radial bearing 104 cooperates with lubricating oil, which is viscous fluid filled in the housing 105, to form a dynamic pressure fluid bearing. Dynamic pressure generating grooves 111 for generating dynamic pressure are formed on an inner circumferential face of the radial bearing 104 in which the rotary shaft 101 is fitted.

The housing 105 in which the radial bearing 104 on which the rotary shaft 101 is supported is accommodated is a single member which has such a shape that it accommodates and surrounds the radial bearing 104 formed in a cylindrical shape as seen in FIG. 18 and is formed by integral molding of a synthetic resin material.

The housing 105 includes a housing body 106 having a cylindrical shape, a bottom closing portion 107 formed integrally with the housing body 106 so as to close up a first end side portion of the housing body 106 and forming a first end side portion, and a top closing portion 108 formed integrally with the housing body 106 and forming a second end side portion of the housing body 106. The housing 105 formed in this manner is formed as a unitary member such that the radial bearing 104 is disposed in the inner circumference side of the housing body 106 by outsert molding synthetic resin material such that the housing 105 surrounds the radial bearing 104 of a cylindrical shape.

A shaft fitting hole 109 is provided at a central portion of the top closing portion 108, and the rotary shaft 101 supported for rotation on the radial bearing 104 accommodated in the housing 105 is fitted in the shaft fitting hole 109. A thrust bearing 110 is formed integrally at a central portion of the inner face of the bottom closing portion 107, and a bearing supporting portion 102 provided on the first end side in the thrust direction of the rotary shaft 101 supported on the radial bearing 104 is supported for rotation on the thrust bearing 110.

The thrust bearing 110 is formed as a pivot bearing which supports the bearing supporting portion 102 of the rotary shaft 101, which is formed in an arcuate shape or a tapering shape, at a point.

The shaft fitting hole 109 is formed such that it cooperates at a circumferential face thereof with an outer circumferential face of a shaft body portion 103 of the rotary shaft 101 to define therebetween an air gap 112 of a distance sufficient to prevent lubricating oil 113 filled in the housing 105 from leaking from within the housing 105.

A tapered portion 114 is provided on an outer circumferential face of the rotary shaft 101 opposing to the inner circumferential face of the shaft fitting hole 109. The tapered portion 114 provides a pressure gradient to the air gap 112 formed between the outer circumferential face of the rotary shaft 101 and the inner circumferential face of the shaft fitting hole 109 to generate force acting to suck the lubricating oil 113 filled in the housing 105 into the inside of the housing 105 thereby to prevent leakage of the lubricating oil 113 filled in the housing 105.

In the bearing unit 100 configured in such a manner as described above with reference to FIG. 18, the rotary shaft 101 is exposed only at one end thereof adjacent the shaft fitting hole 109 but is covered seamlessly with the housing member except the small gap at the shaft fitting hole 109. Therefore, the bearing unit 100 can prevent leakage of the lubricating oil 113 to the outside of the housing 105. In other words, the bearing unit 100 allows assured prevention of leakage when compared with an alternative arrangement wherein a housing is formed by assembling two or more housing members by adhesion by means of a sealing material such as bonding agent. Further, since only the gap of the shaft fitting hole 109 serves as a communicating portion with the outside, scattering of lubricating oil by impact can be prevented.

However, in the bearing unit 100 described above, when the rotary shaft 101 and the housing 105 rotate relative to each other to generate dynamic pressure, the static pressure in the inside of the bearing unit 100 decreases extremely. As the pressure in the inside of the housing 105 decreases, remaining air such as air remaining by a very small amount in the inside of the housing 105 and air dissolved in viscous fluid such as lubricating oil is expanded. Consequently, the viscous fluid may possibly be extruded to and leak from the exposed portion side of the shaft. In the bearing unit 100, if the lubricating oil leaks and can hardly be retained, then good lubrication may not be maintained.

In this manner, the bearing unit 100 shown in FIG. 18 has a problem in that, when dynamic pressure is generated by relative rotation of the rotary shaft 101 and the housing 105, the remaining air in the inside of the housing 105 may be expanded to cause the lubricating oil to leak.

A bearing unit which solves the problem just described is disclosed, for example, in Japanese Patent Laid-open No. 2005-69382. The bearing unit includes, in addition to the configuration of the bearing unit described above, a communicating path for communicating the first and second end sides in the thrust direction of the rotary shaft projecting from the radial bearing with each other. The communicating path prevents drop of the pressure on the closed end side of the shaft. Further, the communicating path discharges therethrough the remaining air in the housing from the shaft fitting hole thereby to prevent leakage of the lubricating oil.

However, also with the bearing unit described, when the remaining air in the housing is to be discharged to the outside from the bearing insertion hole through the communicating path, as the remaining air advances from the closed end side toward the open end side of the shaft, bubbles of the remaining air sometimes gather together to form bubbles of an increased bubble size. Where such bubbles of an increased bubble size are produced, they may possibly stay within the communication path, resulting in failure in smooth discharge of the bubbles to the outside from the communicating path. The remaining air sometimes gives rise to leakage of the lubricating oil.

SUMMARY OF THE INVENTION

Therefore, it is demanded to provide a bearing unit and a motor wherein drop of the pressure in a housing by relative rotation of a shaft and the housing is prevented and remaining air in viscous fluid such as lubricating oil filled in the housing can be discharged smoothly by preventing a leakage phenomenon that the viscous fluid in the housing is extruded to the outside of the housing unit by expansion of the remaining air caused by drop of the pressure in the housing so that the lubricating oil can be retained with certainty for a long period of time.

According to an embodiment of the present invention, there is provided a bearing unit, including: a radial bearing; a thrust bearing; a path forming member; a housing; viscous fluid; and a communicating path. The radial bearing is configured to support a shaft in a circumferential direction. The thrust bearing is configured to support one end of the shaft in a thrust direction. The path forming member is provided on the outer side of the radial bearing and the thrust bearing. The housing is formed so as to accommodate the path forming member in a closed up state and having a shaft fitting hole in which the shaft is fitted. The viscous fluid is filled in the housing. The communicating path which communicates a first end side and a second end side of the shaft in the thrust direction which projects from the radial bearing is formed between the path forming member and the radial bearing. The communicating path has an axial path formed in the axis direction on a circumferential face of the radial bearing and a second end side path formed on the second end side face of the radial bearing. The second end side path is formed by a plurality of projections formed on one of the second end side face of the radial bearing and a face of the housing opposing to the second end side face of the radial bearing. The cross section of the second end side path has a cross sectional area greater than that of the cross section of the axial path.

According to an embodiment of the present invention, also a motor is provided which includes a stator, a rotor, and a bearing unit configured to support the rotor for rotation on the stator, for which the bearing unit described above is used.

In the bearing unit and the motor, drop of the pressure in the housing by relative rotation of the shaft and the housing is prevented, and remaining air in the viscous fluid such as lubricating oil in the housing can be discharged satisfactorily. Further, appearance of a leakage phenomenon that the viscous fluid in the inside of the housing is extruded to the outside of the bearing unit as a result of expansion of remaining air caused by drop of the pressure in the housing can be prevented. Consequently, the lubricating oil can be retained with certainty for a long period of time, and a good lubricating performance can be maintained.

DETAILED DESCRIPTION OF THE PREFERRED EMBODIMENT

In the following, a bearing unit to which an embodiment of the present invention is applied and a motor to which an embodiment of the present invention is applied and which uses the bearing unit are described.

In the present embodiment, the motor is used in a heat radiating apparatus provided in an electronic apparatus such as a portable computer which is an information processing apparatus and performs arithmetic operation processes and so forth of various kinds of information. The portable computer or the like electronic apparatus includes a heat radiating apparatus provided in the inside thereof. The heat radiating apparatus includes a base made of metal, a motor 1 attached to the base, a fan 3 driven to rotate by the motor 1, a fan case 4 having the fan 3 accommodated therein, and a heat sink. The motor 1 for driving the fan 3 of the heat radiating apparatus to rotate is described in detail.

Figure 1:
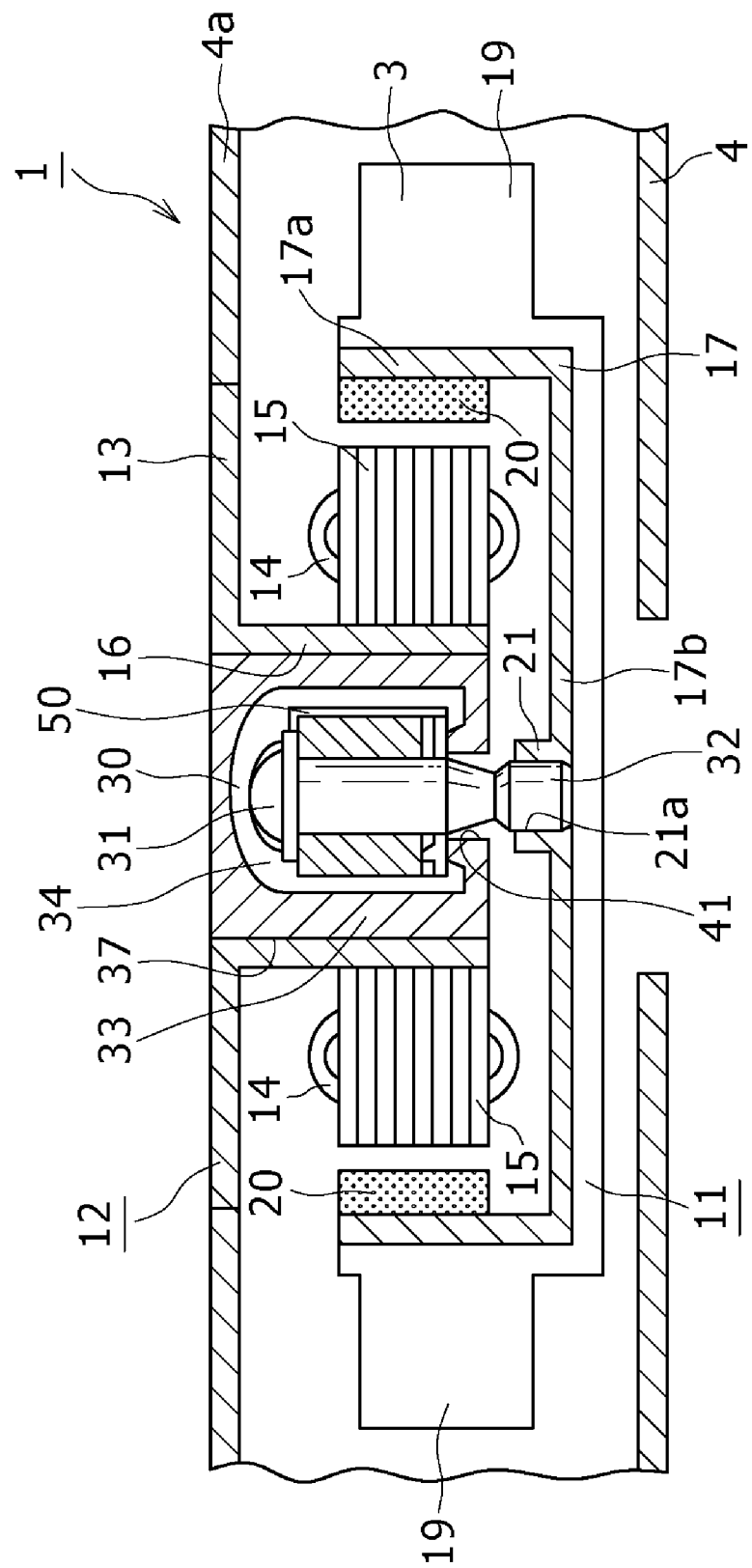
FIG. 1 is a cross sectional view showing a configuration of a motor to which an embodiment of the present invention is applied.

The motor 1 which uses a bearing unit 30 to which an embodiment of the present invention is applied includes a rotor 11 and a stator 12 as seen in FIG. 1.

The stator 12 is provided integrally with a top plate 4a side of the fan case 4 which accommodates the motor 1 and the fan 3 which is driven to rotate by the motor 1. The stator 12 includes a stator yoke 13, a bearing unit 30 to which an embodiment of the present invention is applied, a coil 14, and a core 15 on which the coil 14 is wound. The stator yoke 13 may be formed integrally with the top plate 4a of the fan case 4, that is, formed from part of the fan case 4 or formed as a separate member from the fan case 4. The stator yoke 13 is typically made of iron. The bearing unit 30 is fixed to a holder 16 formed in a cylindrical shape at a central portion of the stator yoke 13 by force fitting or adhesion or else by force fitting and adhesion. The holder 16 in which the bearing unit 30 is force fitted is formed cylindrically integrally with the stator yoke 13. It is to be noted that the fixation of the bearing unit 30 to the holder 16 is not limited to that described above, but, for example, fixation by caulking or by fixation by engagement of resilient projections or the like may be applied instead.

The core 15 is attached to the outer periphery of the bearing unit 30 fixed integrally to the stator yoke 13. The coil 14 to which driving current is supplied is wound on the core 15.

The rotor 11 which cooperates with the stator 12 to form the motor 1 is attached to a rotary shaft 31 supported for rotation on the bearing unit 30 and rotates integrally with the rotary shaft 31. The rotor 11 includes a rotor yoke 17 and the fan 3 having a plurality of blades 19 and rotatable integrally with the rotor yoke 17. The blades 19 of the fan 3 are formed integrally with the rotor yoke 17 by outsert molding on the outer periphery of the rotor yoke 17.

A ring-shaped rotor magnet 20 is provided on an inner circumferential face of a cylindrical portion 17a of the rotor yoke 17 such that it is opposed to the coil 14 of the stator 12. The rotor magnet 20 is a plastic magnet having S poles and N poles disposed alternately in a circumferential direction thereof and is attached to the inner circumferential face of the rotor yoke 17 by a bonding agent. The rotor magnet 20 may otherwise be formed as a rubber magnet, a sintered magnet or the like.

The rotor yoke 17 has a boss portion 21 force fitted in a mounting portion 32 provided at an end portion of the rotary shaft 31 supported on the bearing unit 30 such that it can be rotated integrally with the rotary shaft 31. The boss portion 21 is provided at a central portion of a flat plate portion 17b of the rotor yoke 17 and has a through-hole 21a formed therein.

In the motor 1 having such a configuration as described above, driving current is supplied in a predetermined energization pattern from a driving circuit section provided outside the motor 1 to the coil 14 on the stator 12 side. Thereupon, the rotor 11 rotates integrally with the rotary shaft 31 by an action between a magnetic field generated by the coil 14 and a magnetic field from the rotor magnet 20 on the rotor 11 side. As the rotor 11 rotates, also the fan 3 having the blades 19 and attached to the rotor 11 rotates integrally with the rotor 11. As the fan 3 rotates, the air outside the apparatus is sucked through an opening provided on the housing which forms the computer and is circulated within the housing and around the heat sink provided in the housing and then discharged to the outside of the housing through the through-opening. Consequently, heat generated from heat generating elements is radiated to the outside of the computer body to cool the computer body.

Now, the bearing unit 30 used in the motor 1 is described in more detail.

Figure 2:
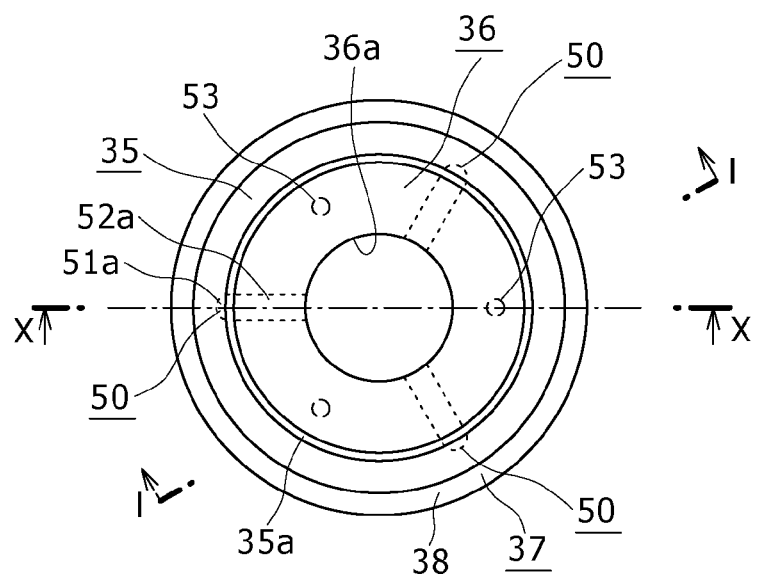
FIG. 2 is a sectional view taken along line Y-Y of FIG. 3 showing a bearing unit to which an embodiment of the present invention is applied.
Figure 3:
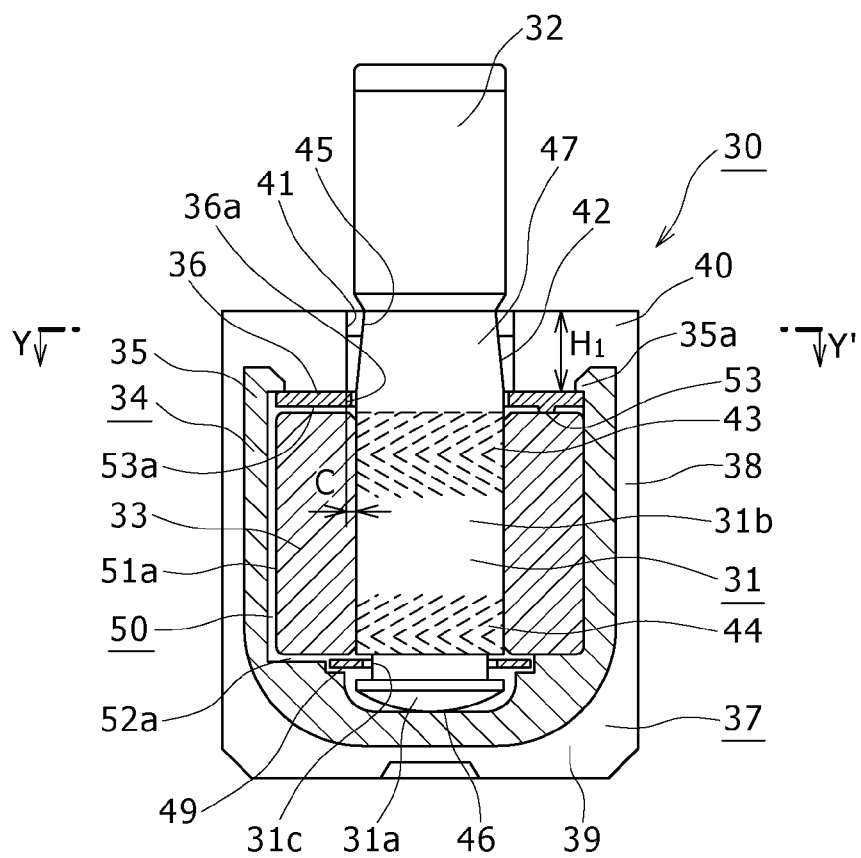
FIG. 3 is a sectional view taken along line X-X of FIG. 2.

Referring to FIGS. 1, 2 and 3, the bearing unit 30 which supports the rotary shaft 31 of the motor 1 for rotation includes a radial bearing 33 for supporting the rotary shaft 31 in a circumferential direction, a path forming member 34 formed on the outer side of the radial bearing 33, a housing 37 in which the path forming member 34 is accommodated, and a communicating path 50 formed between the path forming member 34 and the radial bearing 33.

The radial bearing 33 is formed cylindrically from sintered metal. The radial bearing 33 cooperates with lubricating oil 42 as viscous fluid filled in the housing 37 to form a dynamic pressure fluid bearing. The radial bearing 33 has dynamic pressure generating grooves 43 and 44 formed on an inner circumferential face thereof along which the rotary shaft 31 is fitted.

Figure 4:
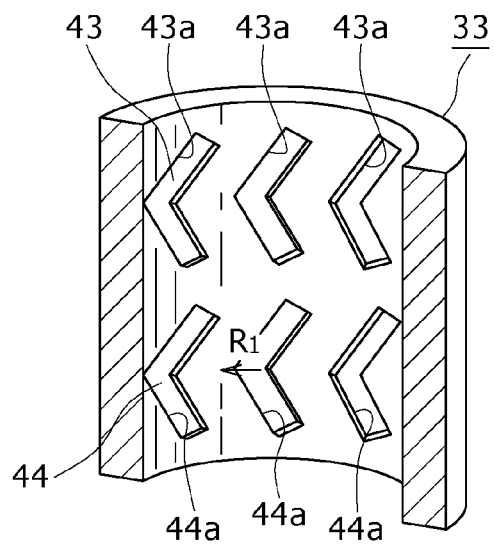
FIG. 4 is a vertical sectional perspective view showing dynamic pressure generating grooves formed on an inner circumferential face of a radial bearing of the bearing unit.

Referring to FIG. 4, the dynamic pressure generating grooves 43 and 44 are formed as a plurality of pairs of V-shaped dynamic pressure generating grooves 43 and 44 on the inner circumferential face of the radial bearing 33. The dynamic pressure generating grooves 43 and 44 are formed such that the bottom of the V shape of the grooves 43a and 44a is directed in a rotating direction R1 of the rotary shaft 31. Here, the dynamic pressure generating grooves 43 and 44 are formed upwardly and downwardly in parallel to each other in the axial direction of the cylindrical radial bearing 33 such that the dynamic pressure generating grooves 43 are formed on the shaft exposure side on which the shaft is open while the dynamic pressure generating grooves 44 are formed on the shaft non-exposure side, that is, the thrust bearing side hereinafter described, on which the shaft is not open. The number and the size of the dynamic pressure generating grooves 43 and 44 to be provided on the radial bearing 33 are suitably selected based on the size, length and so forth of the radial bearing 33. It is to be noted that the radial bearing 33 may be formed otherwise from brass, stainless steel or a high molecular material. Further, while a plurality of dynamic pressure generating grooves 43 and 44 are formed in a V shape, the dynamic pressure generating grooves are not limited to them but may be formed in a herringbone shape such that a plurality of grooves having a V shape are formed on the inner circumferential face of the radial bearing while they are connected to each other in a circumferential direction by a connecting groove.

The radial bearing 33 formed as a dynamic pressure fluid bearing supports the rotary shaft 31 while the rotary shaft 31 rotates. In particular, when the rotary shaft 31 fitted in the radial bearing 33 rotates continuously in the direction of the rotating direction R1 in FIG. 4 around a center axis CL, the lubricating oil 42 filled in the housing 37 flows in the dynamic pressure generating grooves 43 and 44. Thereupon, the lubricating oil 42 generates dynamic pressure between the outer circumferential face of the rotary shaft 31 and the inner circumferential face of the radial bearing 33 thereby to support the rotating rotary shaft 31. The dynamic pressure generated in this instance implements smooth rotation of the rotary shaft 31.

Figure 5:
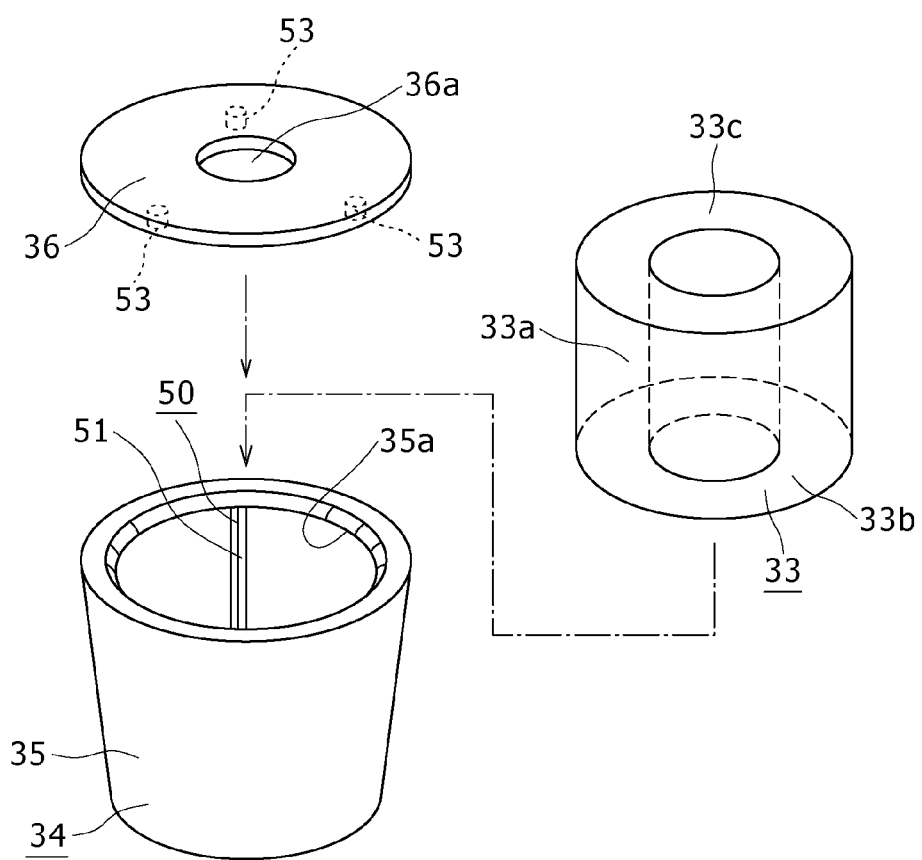
FIG. 5 is an exploded perspective view showing a communicating path formed between a path forming member and the radial bearing.
Figure 6:
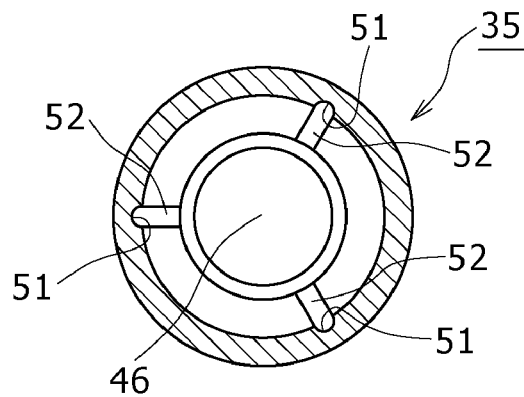
FIG. 6 is a sectional view of the path forming member taken along line Y'-Y' of FIG. 7 showing first and second grooves formed on the path forming member.
Figure 7:
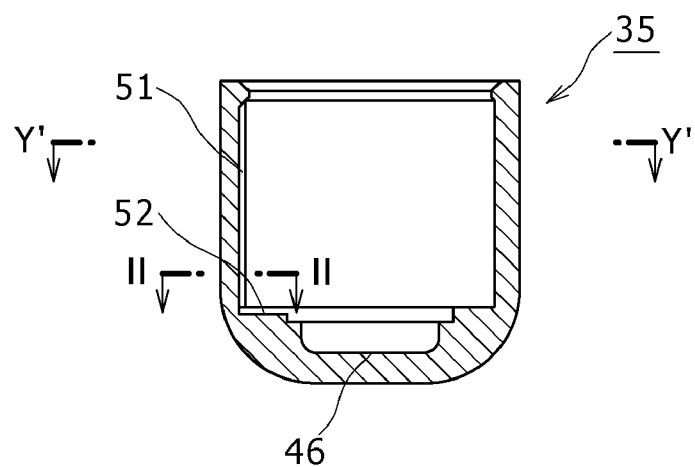
FIG. 7 is a vertical sectional view of the path forming member showing the first and second grooves.

The path forming member 34 provided on the outer side of the radial bearing 33 has such a shape that it accommodates and surrounds the radial bearing 33 formed in a cylindrical shape as seen in FIGS. 3 and 5. The path forming member 34 is formed typically from a synthetic resin material.

Referring to FIGS. 3 and 5, the path forming member 34 includes a path forming member body 35 formed so as to surround a side face 33a and a bottom face 33b of the radial bearing 33, and a path forming member lid member 36 formed so as to surround an top face portion 33c of the radial bearing 33. A shaft fitting hole 36a is provided at a central portion of the path forming member lid member 36, and the rotary shaft 31 supported for rotation on the radial bearing 33 is fitted in the rotary shaft 31.

A thrust bearing 46 is formed integrally at a central portion of the inner face side of the bottom portion of the path forming member body 35, and a bearing supporting portion 31a provided on a first end side in the thrust direction which is the axis direction of the rotary shaft 31 supported on the radial bearing 33 is supported for rotation on the thrust bearing 46. The path forming member 34 is formed from a resin material and used commonly as the thrust bearing 46. The thrust bearing 46 is formed as a pivot bearing which supports the bearing supporting portion 31a of the rotary shaft 31, which is formed in an arcuate shape or a tapering shape, at a point.

It is to be noted here that, while the thrust bearing 46 is formed as part of the path forming member 34, it may otherwise formed independently of the path forming member 34 and disposed on the bottom portion of the path forming member 34.

A pawl-shaped restraining portion 35a is provided circumferentially at an upper portion of the path forming member body 35 and fixed the path forming member lid member 36 in such a manner as to cover the top face portion 33c of the radial bearing 33.

It is to be noted that, while the path forming member 34 described above is made of a resin material, it may otherwise be made of a metal material or a combination of a resin material and a metal material, and there is no restriction to the material. Where the path forming member 34 is made of a resin material, there is an advantage that a preferable shape can be implemented in regard to the phase index with the radial bearing and besides the path forming member 34 can be formed at a low cost. The resin material to be used for the path forming member 34 may be, for example, a synthetic resin material of the fluorocarbon polymer type such as polyimide, polyamide or polyacetal, such a synthetic resin material as polytetrafluoro-ethylene Teflon (registered trademark), or nylon, or such a synthetic resin material as PC (polycarbonate) or ABS (acrylonitrile-butadiene-styrene).

The communicating path 50 is formed between the path forming member 34 and the radial bearing 33. The communicating path 50 communicates the first end portion and the other or second end portion in the thrust direction of the rotary shaft 31 projecting from the radial bearing 33 with each other. In particular, the communicating path 50 communicates the first end side of the rotary shaft 31 which is the bottom side on which the thrust bearing 46 is provided with the other or second end side of the rotary shaft 31 which is the upper side on which the shaft fitting hole 36a of the path forming member lid member 36 is formed.

Referring to FIGS. 5, 6, 7, 8, and 9 the communicating path 50 is formed from a first groove 51, a second groove 52 and a plurality of path forming projections 53 all formed between the radial bearing 33 and the path forming member 34 so as to communicate the first end side and the second end side of the radial bearing 33. The first groove 51 is formed in the thrust direction on the inner circumferential face of the path forming member body 35 of the path forming member 34. The second groove 52 is formed on the inner face side of the bottom of the path forming member body 35. The path forming projections 53 are formed on an inner face 36b of the path forming member lid member 36.

It is to be noted that three such first grooves 51 are formed at positions spaced circumferentially by an equal distance from each other on the inner circumferential face of the path forming member body 35 and extend in the thrust direction. Meanwhile, three such second grooves 52 are formed at positioned spaced circumferentially by an equal distance from each other on the face of the path forming member body 35 on which the radial bearing 33 is placed, and extend in radial directions of the rotary shaft 31. The path forming projections 53 are provided at three positions spaced circumferentially by an equal distance from each other but substantially same in the radial direction on the inner face 36b of the path forming member lid member 36.

More particularly, referring to FIG. 3, each of the communicating paths 50 includes a first path 51a, a second path 52a and a third path 53a. The first path 51a is formed as an axial path extending in the axial direction on the circumferential face of the radial bearing 33 along the first groove 51. The second path 52a is formed as a first end side path on the face of the radial bearing 33 on the first end side, that is, the bottom side, along the second groove 52. The third path 53a is formed as a second end side path on the face of the radial bearing 33 on the second end side, that is, on the top side, between adjacent ones of the path forming projections 53.

The third path 53a is a space formed by the path forming projections 53 between the top face portion 33c of the radial bearing 33 and the inner face 36b which is the lower face of the path forming member lid member 36 and between adjacent ones of the path forming projections 53 as described above. The space functions as the third path 53a.

It is to be noted that, while the number of first and second paths 51a and 52a formed from the first and second grooves 51 and 52 and third paths 53a formed by the path forming projections 53 is three and the first, second and third paths 51a, 52a and 53a are provided in a substantially equally spaced relationship from each other, the number and arrangement of the first, second and third paths 51a, 52a and 53a are not limited to the specific number and arrangement described above.

Figure 10:
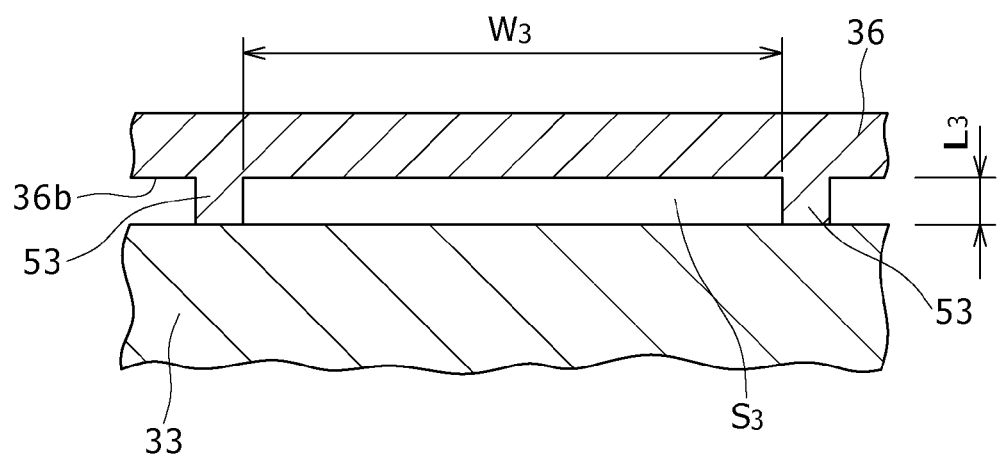
FIG. 10 is a sectional view taken along line I-I of FIG. 2 showing the path forming projections formed on the bottom of the path forming member lid member for forming the communicating path and a third path formed by the path forming projections.
Figure 11:
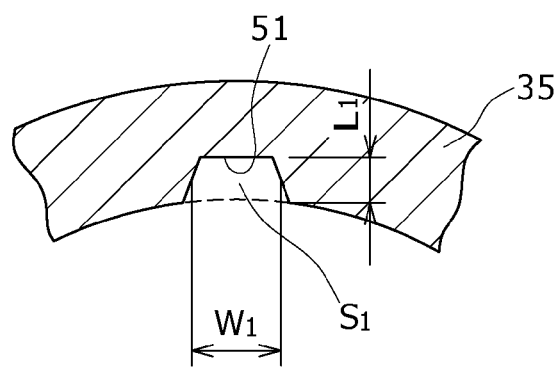
FIG. 11 is a sectional view taken along line II-II of FIG. 7 showing the first groove formed on an inner circumferential face of a path forming member body for forming the communicating path and a first path formed from the first groove.

Referring now to FIGS. 10 and 11, the sectional area of a cross section S3 of the third path 53a in a direction perpendicular to the direction along which the third path 53a extends is greater than the sectional area of a cross section S1 of the first path 51a in a direction perpendicular to the direction along which the first path 51a extends.

Here, the cross section S3 of the third path 53a is a section of the third path 53a perpendicular to a radial direction of the rotary shaft 31 supported on the radial bearing 33 while the cross section S1 of the first path 51a is a section of the first path 51a parallel to the axis direction of the rotary shaft 31 supported on the radial bearing 33.

Therefore, the third path 53a having the cross section S3 greater than the cross section S1 allows air bubbles of a particle size greater than the particle size of air bubbles which can pass through the first groove 51 to pass therethrough.

It is to be noted that the cross section S3 of the third path 53a has a groove depth L3 which depends upon the height of the third path 53a in the axial direction and a groove width W3 which depends upon the distance between adjacent ones of the path forming projections 53.

Meanwhile, the cross section S1 of the first path 51a has a substantially trapezoidal shape and has a groove width W1 which is a dimension of the first path 51a in a radial direction of the rotary shaft 31 and a groove length L1 which is a depth of the first groove 51 from the outer circumferential face of the radial bearing 33. Here, the groove width W1 signifies a mean value of the groove width at different depths and signifies a groove width at the height of a central portion of the groove. Further, the groove width W1 is set greater than the groove length L1, for example, for the convenience of fabrication. The dimension of a smaller one of the groove width W1 and the groove length L1, here, the dimension of the groove length L1, determines the particle size of air bubbles which can pass through the first path 51a.

The groove depth L3 of the third path 53a may otherwise be set greater than the groove length L1 of the first path 51a. In this instance, discharge of air bubbles to the outside can be formed smoother than that in the case described above.

Meanwhile, the second path 52a provided on the bottom of the radial bearing 33 is formed such that, for example, the section thereof in a direction perpendicular to the direction along which the second path 52a extends is smaller than the cross section S1 of the first path 51a, and the groove depth of the second path 52a is smaller than the groove length L1 of the first path 51a.

The communicating paths 50 configured in such a manner as described above moderate drop of the static pressure on the non-open side by communicating the open side and the non-open side of the rotary shaft 31 projecting from the radial bearing 33 with each other to short-circuit the pressure in both regions. Here, the open side of the rotary shaft 31 (hereinafter referred to as "shaft open side") is the top side of the radial bearing 33, that is, the side on which a shaft fitting hole 41 (refer to FIGS. 1 and 3) is provided while the non-open side of the rotary shaft 31 (hereinafter referred to as "shaft non-open side") is the bottom side of the radial bearing 33, that is, the side on which the path forming member lid member 36 is disposed. Further, each of the communicating paths 50 includes the second path 52a, first path 51a and third path 53a provided in order from the shaft non-open side toward the shaft open side, and the size of the cross section of the path increases from the shaft non-open side toward the shaft open side. Therefore, when the lubricating oil 42 circulates from the shaft non-open side toward the shaft open side, it allows remaining air to flow to the shaft open side therethrough even if particles of the remaining air gather together to gradually increase the size of air bubbles of the remaining air.

It is to be noted that the second path 52a provided on the bottom side of the radial bearing 33 as described above may otherwise be formed such that the cross section thereof in a direction perpendicular to the extending direction of the second path 52a is smaller than the cross section S1 of the first path 51a, that is, the groove depth of the second path 52a is smaller than the groove length L1 of the first path 51a or is substantially equal to the groove depth of the first path 51a for the convenience of fabrication.

Since the communicating paths 50 communicate the open side and the non-open side of the rotary shaft 31 projecting from the radial bearing 33 with each other, also when the rotary shaft 31 and the housing 37 rotate relative to each other and dynamic pressure is generated, the static pressure at the end of the rotary shaft 31 on the shaft non-open side which is the side on which the rotary shaft 31 is not open can be prevented from being dropped. Therefore, the communicating paths 50 can prevent otherwise possible extrusion of the lubricating oil by expansion of remaining air in the housing 37 generated upon dropping of the internal static pressure or of air dissolved in the lubricating oil. In other words, since the communicating paths 50 can short-circuit the pressure at the opposite ends of the dynamic pressure generating grooves 43 and 44 provided on the radial bearing 33, no pressure difference appears, and consequently, floating of the shaft does not occur.

Further, the communicating paths 50 allow the lubricating oil 42 to circulate in the inside of the housing 37 when dynamic pressure is generated by the radial bearing 33 which is a dynamic pressure fluid bearing. In particular, the lubricating oil 42 is circulated from the top face 33c side toward the bottom face 33b side along the inner circumference side of the radial bearing 33 and then from the bottom face 33b side toward the top face 33c side along the communicating paths 50 on the outer circumference side of the radial bearing 33. Then, when the lubricating oil 42 circulates on the outer circumference side, the communicating paths 50 can carry remaining air in the lubricating oil 42 to the shaft open side which is the side on which the shaft fitting hole is provided from the shaft non-open side on which the thrust bearing 46 is disposed and discharge the remaining air to the outside through the shaft fitting hole 41.

In addition to such discharge of remaining air to the outside as just described, the communicating paths 50 can discharge remaining air with certainty through the shaft fitting hole 41 thereby to reduce the remaining air in the lubricating oil 42. This is because, since the first, second and third paths 51a, 52a and 53a of the communicating paths 50 have a sectional area which increases toward the shaft open side from the shaft non-open side as described above, even if particles of the remaining air gather together as they advance toward the shaft open side, such a problem that the particles of the remaining air stay intermediately of the communicating paths 50 to choke the communicating paths 50 is prevented.

Further, since the communicating paths 50 are configured such that the third path formed so as to have the greatest cross sectional area is formed from a plurality of path forming projections 53 formed on the inner face side of the path forming member lid member 36, the cross sectional area of the third path positioned on the shaft open side can be formed greater than the cross sectional area of the first path by a simple configuration without complicating the fabrication process and so forth.

The housing 37 in which the path forming member 34 is accommodated is a single member having such a shape that it accommodates and surrounds the path forming member 34 of a substantially cylindrical shape and formed by integral molding of a synthetic resin material.

Referring to FIG. 3, the housing 37 includes a housing body 38 having a cylindrical shape, a bottom closing portion 39 which forms a first end side portion formed integrally with the housing body 38 in such a manner as to close up the first end side of the housing body 38, and a top closing portion 40 formed integrally with the housing body 38 and forming the second end side of the housing body 38. The shaft fitting hole 41 is formed at a central portion of the top closing portion 40, and the rotary shaft 31 supported for rotation on the radial bearing 33 accommodated in the housing 37 is fitted in the shaft fitting hole 41.

The housing 37 having such a configuration as described above is formed integrally with the path forming member 34 disposed on the inner circumference side of the housing body 38 by outsert molding a synthetic resin material in such a manner as to surround the substantially cylindrical path forming member 34. In other words, the housing 37 is formed in such a manner as to close up and accommodate the path forming member 34 in which the radial bearing 33 is accommodated and have the shaft fitting hole 41 in which the shaft fitting hole 41 is fitted.

Although the synthetic resin material used to form the housing 37 is not limited particularly, since the path forming member 34 is formed integrally with the housing 37, preferably a synthetic resin material superior in lubricating performance is used for the housing 37. For example, the housing 37 is preferably formed from a synthetic resin material of the fluorocarbon polymer type such as polyimide, polyamide or polyacetal, or such a synthetic resin material as polytetrafluoro-ethylene Teflon or nylon. Or, the housing 37 may be formed from such a synthetic resin material as PC (polycarbonate) or ABS (acrylonitrile-butadiene-styrene) or liquid crystal polymer.

Incidentally, since the bearing unit 30 has a seamless structure wherein the housing 37 is enclosed together with the radial bearing 33 and the path forming member 34 except the shaft fitting hole 36a, although the shaft open side and the shaft non-open side of the rotary shaft 31 projecting from the radial bearing 33 are communicated with each other by the communicating paths 50, they are closed up from the outside except the shaft fitting hole 36a provided on the housing 37.

In other words, the bearing unit 30 can prevent lubricating oil from being scattered by a shock or the like because the communicating paths 50 are provided in the housing 37 formed seamlessly and closed up from the outside.

In the rotary shaft 31 supported for rotation on the radial bearing 33 disposed in the housing 37 and the thrust bearing 46 provided integrally with the housing 37, the bearing supporting portion 31a of a shaft body 31b supported by the thrust bearing 46 is formed in an arcuate shape or a tapering shape, and the mounting portion 32 to which, for example, the rotor 11 of the motor 1 which is a rotary member is attached is provided on the other end side of the shaft body 31b. Here, the shaft body 31b and the mounting portion 32 are formed with an equal diameter.

Referring to FIG. 3, the rotary shaft 31 is supported at the bearing supporting portion 31a on the first end side thereof on the thrust bearing 46 and at the outer circumferential face of the shaft body 31b thereof on the radial bearing 33. Thus, the rotary shaft 31 is supported on the housing 37 such that the mounting portion 32 side provided on the second end side thereof projects from the shaft fitting hole 41 provided in the top closing portion 40 of the housing body 38.

Meanwhile, a shaft coming off preventing groove 31c for preventing axial coming off of the rotary shaft 31 is provided on the rotary shaft 31 between the bearing supporting portion 31a and the shaft body 31b. A washer 49 serving as shaft coming off preventing means is provided on the path forming member 34 in a corresponding relationship to the shaft coming off preventing groove 31c. The shaft coming off preventing groove 31c and the washer 49 are engaged with each other to improve handling upon assembly. The washer 49 is made of a high molecular material such as nylon, polyamide or polyimide or a metal material such as stainless steel or phosphor bronze.

Incidentally, the shaft fitting hole 41 is formed with an inner diameter a little greater than the outer diameter of the shaft body 31b so that the rotary shaft 31 fitted in the shaft fitting hole 41 may rotate without slidably contacting with the inner circumferential face of the shaft fitting hole 41. At this time, the shaft fitting hole 41 is formed such that an air gap 45 having a distance sufficient to prevent the lubricating oil 42 filled in the housing 37 from leaking from within the housing 37 is provided between the inner circumferential face of the shaft fitting hole 41 and the outer circumferential face of the shaft body 31b. The top closing portion 40 in which the shaft fitting hole 41 is formed so as to cooperate with the rotary shaft 31 to form the air gap 45 which prevents leakage of the lubricating oil 42 filled in the housing 37 forms an oil seal section.

The outer circumferential face of the rotary shaft 31 opposed to the inner circumferential face of the shaft fitting hole 41 has a tapered portion 47 provided thereon. The tapered portion 47 is formed so as to expand the air gap 45 formed between the outer circumferential face of the rotary shaft 31 and the inner circumferential face of the shaft fitting hole 41 in an outward direction of the housing 37. The tapered portion 47 forms a pressure gradient in the air gap 45 formed by the outer circumferential face of the rotary shaft 31 and the inner circumferential face of the shaft fitting hole 41 so as to generate force to suck the lubricating oil 42 filled in the housing 37 into the inside of the housing 37. Since, upon rotation of the rotary shaft 31, the lubricating oil 42 tends to be sucked into the inside of the housing 37, the lubricating oil 42 flows into the dynamic pressure generating grooves 43 and 44 formed from the dynamic pressure fluid bearing with certainty to generate dynamic pressure. Consequently, stabilized supporting of the rotary shaft 31 can be implemented, and besides, leakage of the lubricating oil 42 filled in the housing 37 can be prevented.

In the bearing unit 30 to which an embodiment of the present invention is applied, the lubricating oil 42 which advances into the dynamic pressure generating grooves 43 and 44 provided on the radial bearing 33 which forms a dynamic pressure fluid bearing is filled from within the housing 37 so as to be opposed to the air gap 45 formed by the tapered portion 47 formed on the rotary shaft 31 and the inner circumferential face of the shaft fitting hole 41. In other words, the lubricating oil 42 is filled in the gap in the housing 37 and impregnated into the radial bearing 33 made of a sintered metal material.

According to the bearing unit 30, scattering of the lubricating oil 42 can be prevented by a surface tension seal by adjusting the distance c of the air gap 45 and the height $H_1$ of the shaft fitting hole 41, and a pressure gradient can be generated in the lubricating oil 42 positioned in the air gap 45 thereby to generate force to suck the lubricating oil 42 into the inside of the housing 37 by providing the tapered portion 47. Consequently, it is possible to prevent air from being included into the lubricating oil 42 and prevent leakage of the lubricating oil 42 thereby to assure further stabilized rotation of the rotary shaft 31. On the bearing unit 30 described hereinabove, while the tapered portion 47 is provided on the rotary shaft 31 side, it may otherwise be provided on the inner circumferential face of the shaft fitting hole 41 of the housing 37.

A process of fabricating the bearing unit 30 to which an embodiment of the present invention is applied and which has such a configuration as described above is described.

Figure 12:
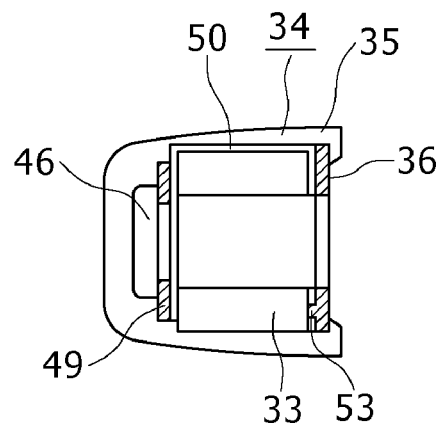
FIG. 12 is a schematic view illustrating a temporary assembly step in a process for fabricating the bearing unit.
Figure 13:
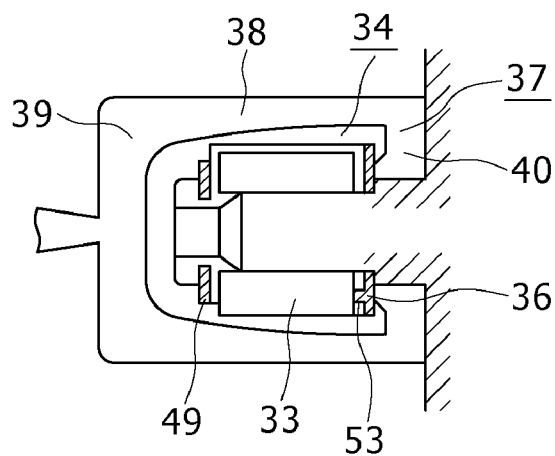
FIG. 13 is a schematic view illustrating an outsert molding process of a housing in the fabrication process.

In order to fabricate the bearing unit 30 to which an embodiment of the present invention is applied, the path forming member 34 is attached to the outer side of the radial bearing 33 to temporarily assemble them. Upon such temporary assembly of the radial bearing 33 and the path forming member 34, the washer 49 serving as shaft coming off preventing means for the rotary shaft 31 is attached to the path forming member body 35 as seen in FIG. 12. Then, the path forming member body 35 and the path forming member lid member 36 are attached to the radial bearing 33 which is a dynamic pressure fluid bearing. In this instance, the thrust bearing 46 is formed integrally in the inside of the path forming member body 35. Further, the communicating path 50 is formed between the path forming member 34 and the radial bearing 33.

Then, the radial bearing 33 and the path forming member 34 in the temporarily assembled state is attached to a metal mold, and one of such synthetic resin materials as mentioned hereinabove is outsert molded on the outer circumferential face of the radial bearing 33 and the path forming member 34 in the temporarily assembled state to form the housing 37. In this instance, upon the outsert molding into the housing 37, the path forming member 34 is integrated in the inside of the housing 37 and held by the top closing portion 40 and the bottom closing portion 39 formed integrally at the upper and lower portions of the cylindrical housing body 38 thereby to fix the attached position thereof. Further, upon the outsert molding of the housing 37, since the communicating paths 50 between the path forming member 34 and the radial bearing 33 are shut up by the path forming member 34, no synthetic resin material is admitted into the communicating paths 50.

Thereafter, the rotary shaft 31 is fitted into the shaft fitting hole 41 formed in the top closing portion 40 until it is inserted into the housing 37. At this time, the rotary shaft 31 is fitted into the radial bearing 33 and inserted into the housing 37 with the bearing supporting portion 31a thereof abutted with the thrust bearing 46. The rotary shaft 31 supported by the radial bearing 33 is supported for rotation in the housing 37.

After the rotary shaft 31 is inserted into the housing 37, the lubricating oil 42 is filled into the housing 37. In order to fill the lubricating oil 42, the housing 37 in which the rotary shaft 31 is inserted is thrown into a filling tank in which the lubricating oil is accommodated. Then, the filling tank in which the housing is disposed is sucked by vacuum by means of a vacuum apparatus. Thereafter, the filling tank is taken out into the atmospheric air, whereupon the lubricating oil 42 is filled into the housing 37.

At this time, the lubricating oil 42 is filled such that, if it expands by a temperature variation, then it is prevented from leaking to the outside of the housing 37 from within the shaft fitting hole 41, but if the lubricating oil 42 contracts by a temperature variation, then insufficient filling into the path forming member 34 formed between the rotary shaft 31 and the shaft fitting hole 41 does not occur. In other words, the variation of the height of the oil level of the lubricating oil 42 by a temperature variation is set so as to remain within the range of the shaft fitting hole 41.

When the filling of the lubricating oil 42 into the housing 37 is performed by vacuum suction using the vacuum apparatus, the internal pressure of the housing 37 becomes lower than the external pressure of the housing 37. As a result, the lubricating oil 42 is prevented readily from leaking from the housing 37.

Since the radial bearing 33 of the bearing unit 30 is formed from a sintered metal material, the lubricating oil 42 is filled into the radial bearing 33 and is filled also into the dynamic pressure generating grooves 43 and 44 which generate dynamic pressure when the rotary shaft 31 rotates. In other words, the lubricating oil 42 is filled into all air gaps in the housing 37.

While the housing of the bearing unit described above is formed from a molded member of a synthetic resin material, the material of the housing is not limited to a synthetic resin material, but the housing may be formed otherwise from a synthetic resin material in which a metal material which can be molded using a metal mold apparatus is mixed or from any other molding material.

The bearing unit 30 having the configuration described above solves the problem of a dynamic pressure fluid bearing unit of the shaft piece open type provided with a seamless housing made of a resin material which is very useful to leakage prevention of lubricating oil but has a drawback that extrusion of the lubricating oil caused by expansion of remaining air in the lubricating oil or air dissolved in the lubricating oil which occurs simultaneously with rotation of the shaft is likely to occur.

In particular, the bearing unit 30 is structured such that the communicating paths 50 for short-circuiting the pressure at the opposite ends of the radial bearing and the route extends along the shaft non-open side-communicating path-shaft open side without extending along the shaft non-open side-path-housing outer side-shaft open side while the path forming member 34 in which the communicating paths 50 are formed is covered therearound with the housing 37.

In particular, the bearing unit 30 can prevent leakage of the lubricating oil by extrusion of remaining air since the path forming member 34 is provided such that the communicating paths 50 which provide the route of the bearing lower end-paths-bearing upper end between the upper end and the lower end of the radial bearing 33 so that the drop of the static pressure on the shaft non-open side which is the closed up lower end can be moderated.

Further, in the bearing unit 30, the cross section of the third path 53a provided on the shaft open side of the communicating paths 50 is set greater than the cross section of the first path 51a and the communicating paths 50 are formed so as to increase the cross section thereof toward the shaft open side. Therefore, with the bearing unit 30, remaining air mixed in the lubricating oil 42 filled in the housing 37 can be fed from the communicating paths 50 to the shaft open side on which the shaft fitting hole 41 is provided so as to be discharged satisfactorily from the shaft fitting hole 41 to the outside of the housing 37.

Further, in the bearing unit 30, the communicating paths 50 wherein the cross section of the third path 53a is greater than the cross section of the first path 51a are implemented by providing the path forming projections 53 formed on the inner face 36b side of the path forming member lid member 36. Consequently, the communicating paths 50 can be implemented by a simple configuration without requiring a complicated fabrication process and can discharge remaining air satisfactorily as described above.

Furthermore, in the bearing unit 30, the rotary shaft 31 is exposed only at one end thereof on the shaft fitting hole 41 side but is closed up seamlessly with the housing 37 except the small gap of the shaft fitting hole 41 at the one end of the rotary shaft 31 such that the route to the outside of the housing remains provided only by the very small air gap between the rotary shaft 31 and the housing 37. Therefore, the possibility that the lubricating oil may leak by oozing out from a joining portion where a member for filling the lubricating oil 42 is joined can be prevented, and scattering of the lubricating oil by an impact can be prevented thereby to achieve a good lubricating performance.

According to the bearing unit 30 to which an embodiment of the present invention is applied, drop of the pressure in the housing 37 by relative rotation of the rotary shaft 31 and the housing 37 can be prevented, and discharge of remaining air mixed in viscous fluid such as the lubricating oil 42 filled in the housing 37 can be carried out satisfactorily. Therefore, appearance of a leakage phenomenon that the lubricating oil 42 in the inside of the housing 37 is extruded to the outside of the bearing unit 30 as a result of expansion of remaining air caused by drop of the pressure in the housing 37 can be prevented. Consequently, the lubricating oil can be retained with certainty for a long period of time, and a good lubricating performance can be maintained.

Further, also where a porous sintered metal material is used as the radial bearing 33, although in the past it is difficult to fully discharge remaining air dissolved in lubricating oil filled around the sintered metal, according to the bearing unit 30 to which an embodiment of the present invention is applied, it is possible to satisfactorily discharge remaining air dissolved in lubricating oil filled around the radial bearing 33. Consequently, since such a leakage phenomenon of lubricating oil as described above can be prevented, even where a porous sintered metal material or a like material is used, a good lubricating performance can be maintained for a long period of time, and a less expensive configuration can be achieved.

It is to be noted that, while, in the bearing unit 30 described hereinabove, three path forming projections 53 are formed on the inner face side of the path forming member lid member 36, the number of such path forming projections 53 is not limited to this, but only it is necessary for a plurality of path forming projections 53 to be provided such that paths can be formed between the top face portion 33c of the radial bearing 33 and the path forming member lid member 36. For example, five path forming projections 63 may be provided in a substantially equally spaced relationship from each other in a circumferential direction as seen in FIGS. 14 and 15.

Figure 14:
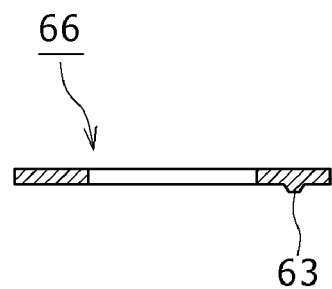
FIG. 14 is a sectional view showing another path forming projection formed on the path forming member lid member.
Figure 15:
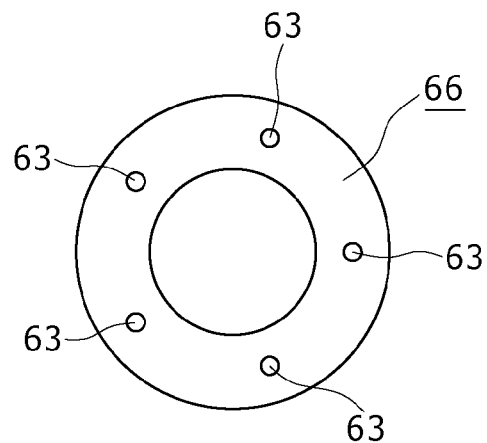
FIG. 15 is a bottom plan view of the path forming member lid member shown in FIG. 14.

Referring to FIGS. 14 and 15, five path forming projections 63 are provided at positions spaced by a substantially equal distance from each other in a circumferential direction on an inner face 66b of a path forming member lid member 66. The path forming projections 63 are formed so as to project in an axial direction of the rotary shaft 31.

Figure 16:
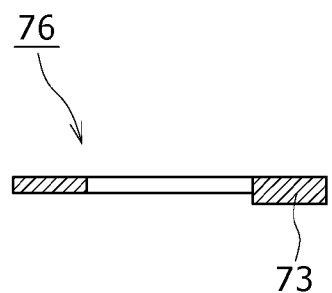
FIG. 16 is a sectional view showing a further path forming projection formed on the path forming member lid member.
Figure 17:
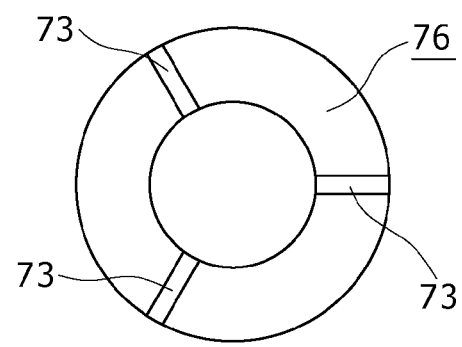
FIG. 17 is a bottom plan view of the path forming member lid member shown in FIG. 16.
Figure 18:
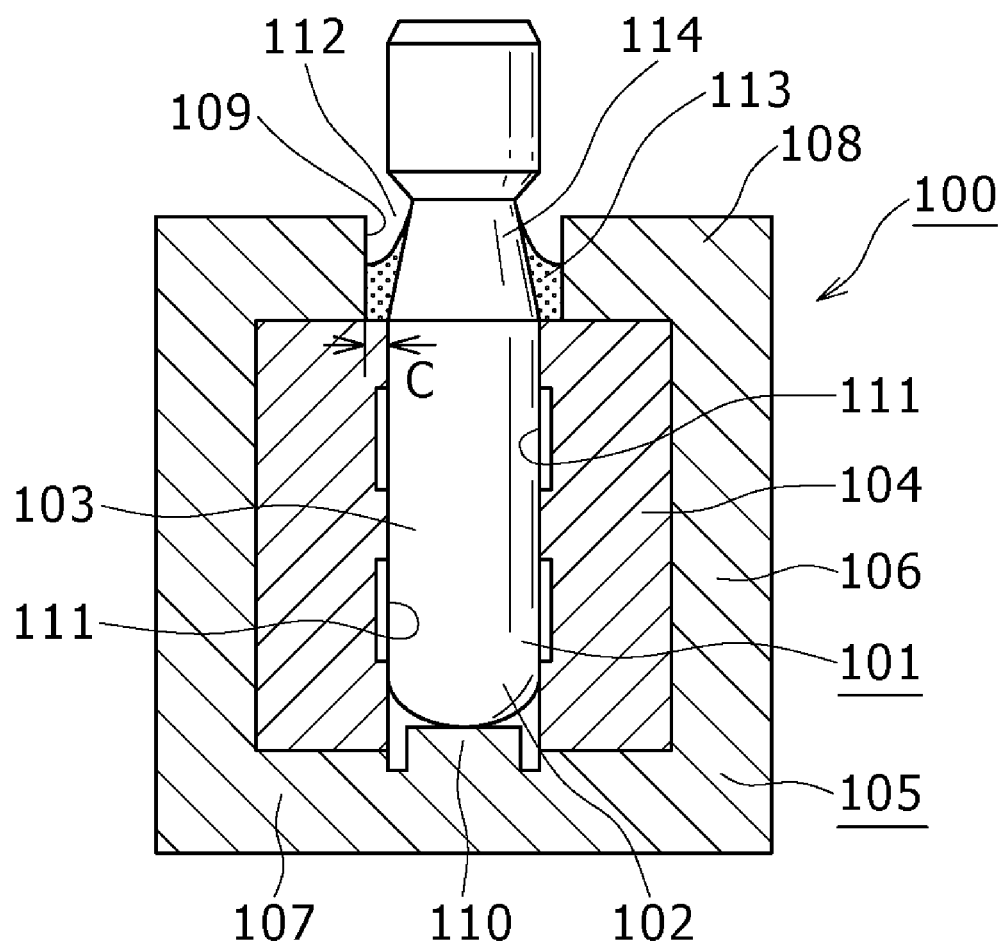
FIG. 18 is a sectional view showing a bearing unit in the past.

Further, the path forming projections formed on the inner face side of the path forming member lid member are not limited to those of such a circular cylindrical shape but may be formed as, for example, those of a rectangular column shape having a substantially rectangular shape in cross section whose longitudinal direction coincides with a radial direction as seen in FIGS. 16 and 17.

Referring to FIGS. 16 and 17, three path forming projections 73 are formed at positions spaced equally from each other in a circumferential direction on an inner face 76b of a path forming member lid member 76 such that they project in an axial direction of the rotary shaft 31 so as to have a rectangular column shape. More particularly, each of the path forming projections 73 is formed such that the shape of a cross section perpendicular to the axial direction is a substantially rectangular shape and has a dimension in a radial direction which is substantially equal to the dimension of the path forming member lid member 76 in the same direction.

Figure 8:
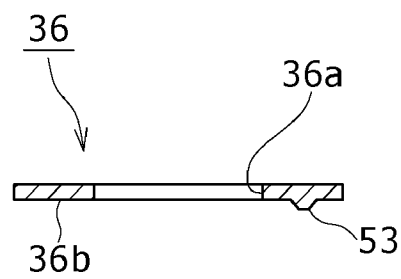
FIG. 8 is a sectional view of a path forming member lid member showing a path forming projection formed on the path forming member lid member.
Figure 9:
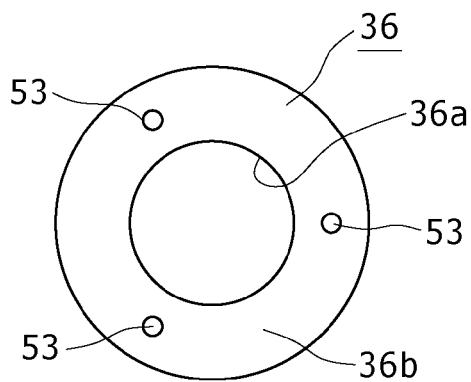
FIG. 9 is a bottom plan view of the path forming member lid member showing the path forming projections formed on the path forming member lid member.

Also where the path forming projections 63 or 73 shown in FIGS. 14 to 17 are formed, the third path is formed between the top face 33c of the radial bearing 33 and a bottom face 63b or 73b of the path forming projection 63 or 73 and between adjacent ones of the path forming projections 63 or 73 similarly as in the case wherein the path forming projections 53 shown in FIGS. 8 and 9 are provided to form the third path 53a as described hereinabove. Also the third path in this instance is formed with a cross sectional area greater than the cross sectional area of the first path 51a similarly as in the case described hereinabove.

Further, while, in the bearing unit 30 described hereinabove, the communicating paths 50 are formed from the first and second grooves 51 and 52 and the path forming projections 53 provided on the path forming member 34, they may otherwise be formed on the radial bearing 33 side.

In particular, the communicating paths 50 between the radial bearing 33 and the path forming member 34 may each be formed from a first groove formed in a thrust direction on the outer circumferential face of the radial bearing 33, a second groove formed on the bottom face 33b which is a face of the radial bearing 33 on a first end side on which the thrust bearing 46 is provided, and a plurality of path forming projections formed on the top face 33c which is the second end side face opposite to the first end side face of the radial bearing 33. The first end side and the second end side of the radial bearing 33 are thus communicated with each other. Also in this instance, the cross section of the paths formed by the path forming projections is greater than the cross section of the path formed from the first groove.

Further, the communicating paths formed in the bearing unit 30 may be a combination of the first and second grooves 51 and 52 and the path forming projections 53, 63 or 73 provided on the path forming member 34 side and the first and second grooves and the path forming projections provided on the radial bearing 33.

The motor 1 to which an embodiment of the present invention is applied includes the bearing unit 30 which supports the rotor 11 for rotation on the stator 12. Consequently, the motor 1 can prevent leakage of lubricating oil and maintain a good lubricating performance for a long period of time.

The bearing unit according to an embodiment of the present invention can be applied not only to a bearing as a cooling fan motor of heat radiating apparatus or a spindle motor of a disk drive but also to a bearing as various kinds of motors.

The bearing unit according to an embodiment of the present invention can be applied not only to a motor but also widely to various mechanisms which include a rotary shaft or which support a part rotatable around a shaft.

It should be understood by those skilled in the art that various modifications, combinations, sub-combinations and alterations may occur depending on design requirements and other factors insofar as they are within the scope of the appended claims or the equivalents thereof.

What is claimed is:

1. A bearing unit, comprising:

a radial bearing configured to support a shaft in a circumferential direction;

a thrust bearing configured to support one end of the shaft in a thrust direction;

a path forming member provided on the outer side of said radial bearing and said thrust bearing;

a housing formed so as to accommodate said path forming member in a closed up state and having a shaft fitting hole in which said shaft is fitted;

viscous fluid filled in said housing; and a communicating path which communicates a first end side and a second end side of the shaft in the thrust direction which projects from said radial bearing formed between said path forming member and said radial bearing;

said communicating path having an axial path formed in the axis direction on a circumferential face of said radial bearing and a second end side path formed on the second end side face of said radial bearing, wherein said second end side path is formed by a plurality of projections formed on one of the second end side face of said radial bearing and a face of said housing opposing to the second end side face of said radial bearing, and the cross section of said second end side path has a cross sectional area greater than that of the cross section of said axial path.

2. A motor, comprising:

a stator;

a rotor; and a bearing unit configured to support said rotor for rotation on said stator;

said bearing unit including a radial bearing configured to support a shaft of said rotor in a circumferential direction, a thrust bearing configured to support one end of the shaft in a thrust direction, a path forming member provided on the outer side of said radial bearing and said thrust bearing, a housing formed so as to accommodate said path forming member in a closed up state and having a shaft fitting hole in which said shaft is fitted, viscous fluid filled in said housing, and a communicating path which communicates a first end side and a second end side of the shaft in the thrust direction which projects from said radial bearing formed between said path forming member and said radial bearing, said communicating path having an axial path formed in the axis direction on a circumferential face of said radial bearing and a second end side path formed on the second end side face of said radial bearing, wherein said second end side path being formed by a plurality of projections formed on one of the second end side face of said radial bearing and a face of said housing opposing to the second end side face of said radial bearing.

* * * * *